B. O. FANSLOW.
FEEDING MECHANISM FOR CHECK PROTECTING MACHINES.
APPLICATION FILED JUNE 3, 1918.
1,333,107.
Patented Mar. 9, 1920.
3 SHEETS—SHEET 1.
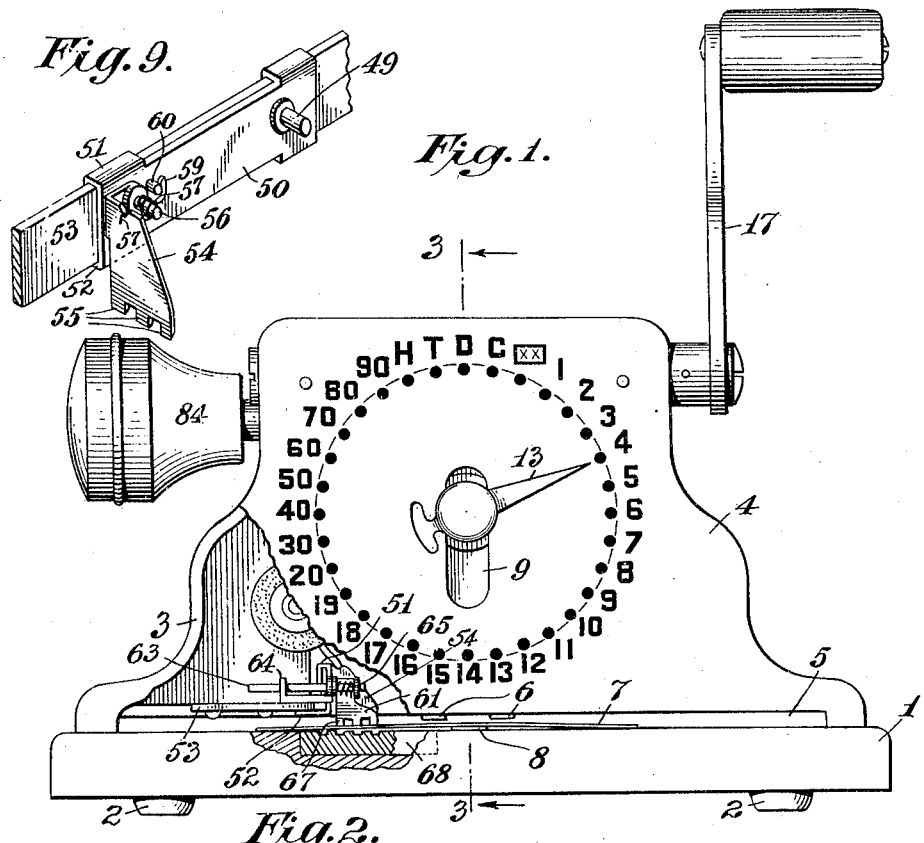
Fig. 9.
Fig. 1.
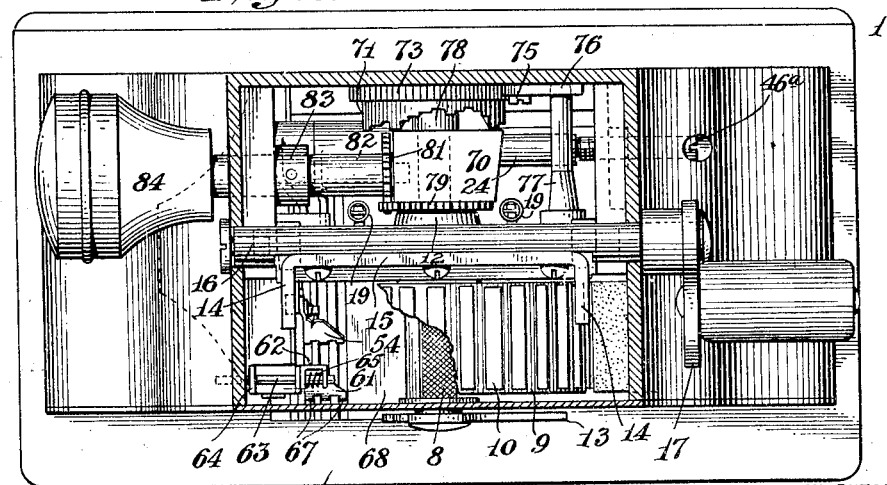
Fig. 2.
INVENTOR:
Benjamin O. Fanslow.
BY
Chas. M. Chapman
ATTORNEY.

B. O. FANSLOW.
FEEDING MECHANISM FOR CHECK PROTECTING MACHINES.
APPLICATION FILED JUNE 3, 1918.
1,333,107.
Patented Mar. 9, 1920.
3 SHEETS—SHEET 2.
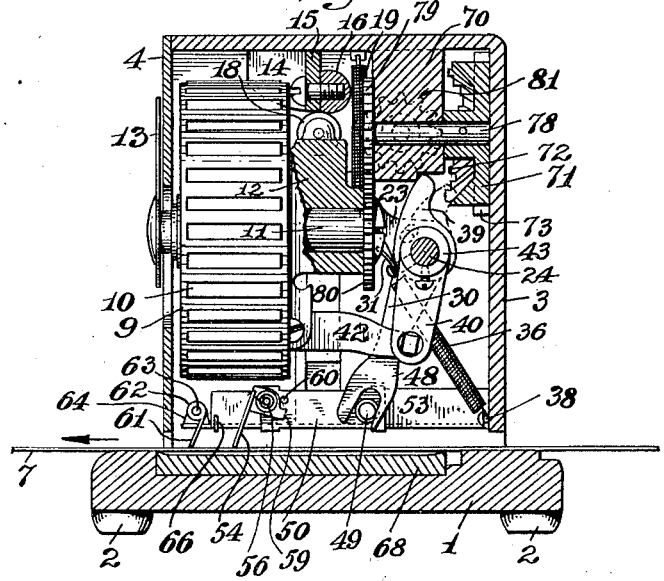
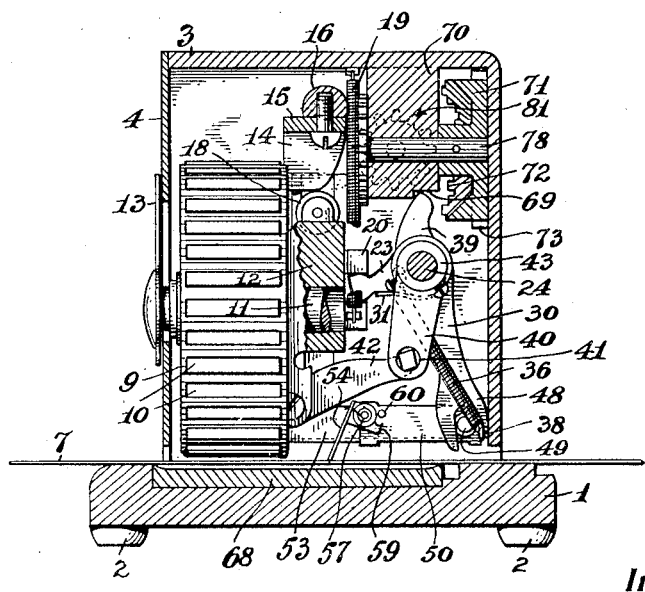
Inventor:
Benjamin O. Fanslow.
by
Chas. M. Chapman, Atty.

B. O. FANSLOW.
FEEDING MECHANISM FOR CHECK PROTECTING MACHINES.
APPLICATION FILED JUNE 3, 1918.
1,333,107.
Patented Mar. 9, 1920.
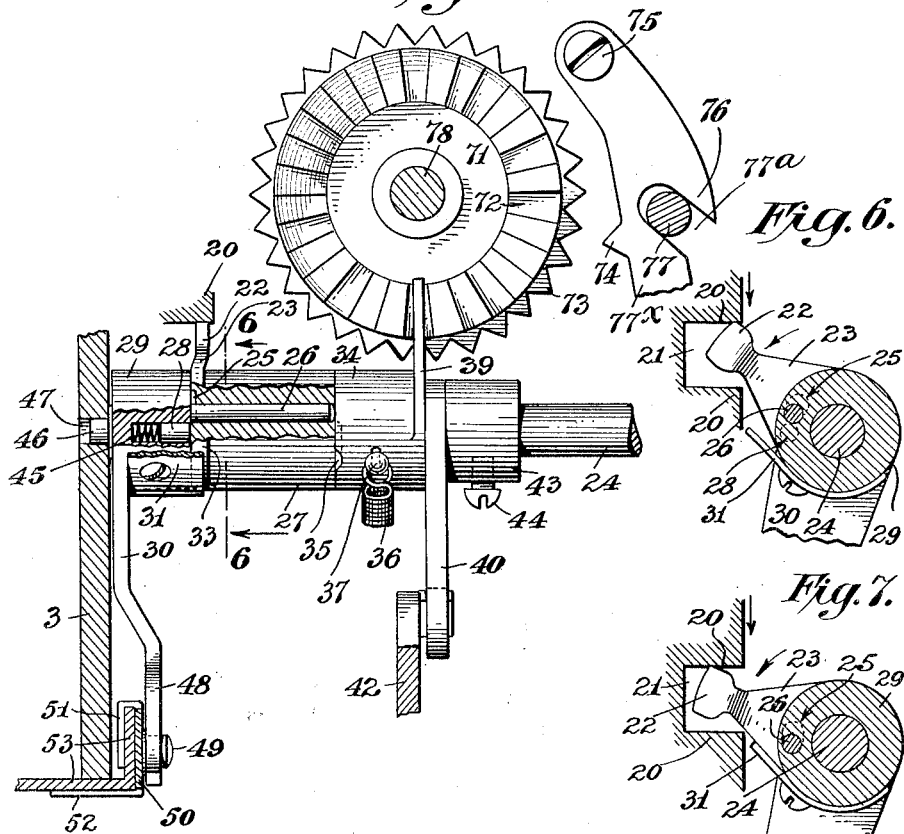
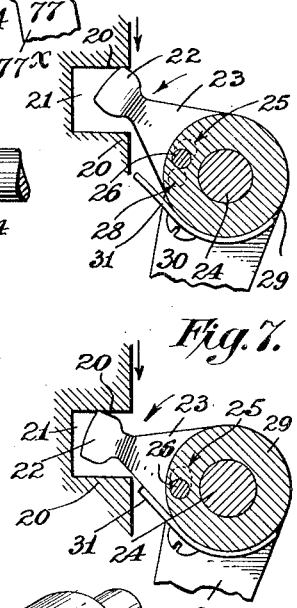
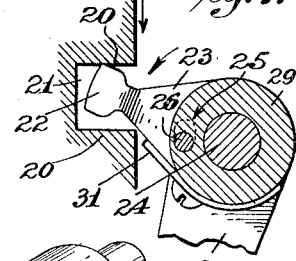
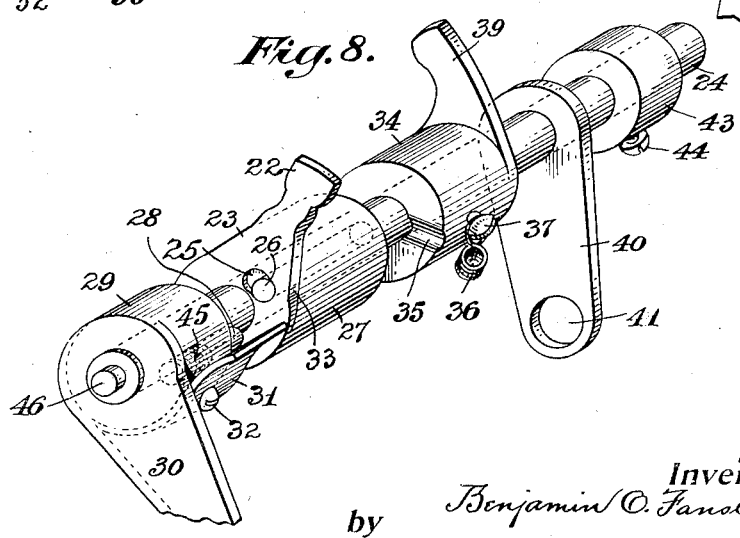
Inventor:
Benjamin O. Fanslow
by
Chas. M. Chapman, Atty.

UNITED STATES PATENT OFFICE.

BENJAMIN O. FANSLOW, OF WHITE PLAINS, NEW YORK, ASSIGNOR TO NEW ERA MFG. CO., OF NEW YORK, N. Y., A CORPORATION OF NEW YORK.

FEEDING MECHANISM FOR CHECK-PROTECTING MACHINES.

1,333,107. Specification of Letters Patent. Patented Mar. 9, 1920.

Application filed June 3, 1918. Serial No. 237,968.

*To all whom it may concern:*

Be it known that I, BENJAMIN O. FANSLOW, a citizen of the United States, residing in White Plains, county of Westchester, and State of New York, have invented a new and useful Improvement in Feeding Mechanism for Check-Protecting Machines, of which the following is a description.

The invention relates to new and useful improvements in check protecting machines, and more particularly to a check protecting machine of the check-writer type.

An object of the invention is to provide a machine of the above type, wherein the check being printed is fed by means of a reciprocating feed dog which directly engages the check and feeds the same forward a distance corresponding to the length of the word which has been printed.

Another object of the invention is to provide a machine of the above type, wherein the check being printed is fed by means of a reciprocating feed dog which directly engages the check and feeds the same forward a distance corresponding to the length of the word which has been printed, and wherein the stroke of the reciprocating feed dog is varied as the length of the word printed varies and in proportion thereto.

Another object of the invention is to provide a feeding mechanism of the above type wherein the feed dog is arranged to reciprocate in a line parallel with the length of the printing block and in a path at one side of the printing block.

A further object of the invention is to provide a check retainer which positively grips and holds the check from movement during the rearward stroke of the feed dog, which check retainer is yieldingly mounted so as to permit the free forward movement of the check under the feeding action of the feed dog.

A further object of the invention is to provide a feeding mechanism of the above character, wherein the supporting bed or plate on which the check rests is formed with spaced ribs and the feed dog is formed with spaced projections extending between the ribs for bending the paper to firmly grip the same.

A still further object of the invention is to provide a machine of the above character, wherein the stroke of the feed dog is determined by varying the extreme forward position of the feed dog, the rear position of the feed dog being substantially fixed, and wherein the feeding device is so timed that said printing wheel is free from the check before the forward movement of the check through the action of the feed dog begins.

Still another object of the invention is to provide a feeding mechanism of the above type, wherein the stroke of the feed dog is brought about by a positive connection with the feed dog actuator, and wherein said positive connection is broken at a time determined by the length of the word which has been previously printed.

With the above objects in view and others which will be detailed during the course of this description, my invention consists in the parts, features, elements and combinations thereof hereinafter described and claimed.

In order that my invention may be clearly understood, I have provided drawings wherein:

Figure 1 is a front elevation of my check protecting machine, the face-plate being partly broken away to show interior features of construction and a portion of the bed of the machine being broken away and in section to show other details;

Fig. 2 is a horizontal section just above the plane of the operating shaft;

Fig. 3 is a section substantially on the line 3—3 of Fig. 1, but showing the printing-wheel in elevation, the feeding mechanism being shown at the limit of a feed stroke;

Fig. 4 is a sectional view similar to Fig. 3, but showing the printing-wheel and feeding mechanism in a different position, the latter being at the limit of its rearward stroke preparatory to a feeding operation;

Fig. 5 is a sectional elevation of details of the feeding mechanism and its controller;

Fig. 6 is a section substantially on the line 6—6 of Fig. 5;

Fig. 7 is a view similar to Fig. 6 showing a different position of the parts;

Fig. 8 is a perspective view of the elements carried by the feed-shaft, separated from each other on said shaft in order to show the details of construction; and Fig. 9 is a perspective view of the feed-dog, slide and guide-bar, the latter being curtailed at both ends.

The invention is directed broadly to a check-writer, wherein a printing wheel and a platen are provided which have a relative movement to each other to bring about a contact between the printing block and the check, and wherein the check is positively fed a variable distance by means of a reciprocating feed dog, which feed dog is provided with prongs adapted to work in grooves in a supporting plate or bed so as to bend the paper and firmly grip the same. The paper is held from retrograde movement when the feed dog is retracted by means of a check retainer or detent, which is also provided with prongs for bending and gripping the paper. The feed dog is reciprocated by means connected with the carrier which moves the printing wheel to bring the printing block into engagement with the check. This reciprocating means includes an operating feed arm connected with a feed slide carrying the feed dog, an actuator which is connected with the printing wheel and a controller. The actuator is positively connected at times with a feed arm so as to positively move the same and the controller serves to break the positive connection at a time determined by the length of the word which has been printed. The actual distance to which the check is fed is the length of the word plus the space between words, but as the space between words is uniform, the length of feed stroke may be referred to as controlled by the length of the printed word. These actuating parts are positively connected for moving the feed dog forward at the up-stroke of the carrier in which the printing wheel is mounted and the parts are so constructed and timed that the positive connection for moving the feed dog does not come into effective action until the printing wheel is raised sufficiently to free the type from the check; and, as above noted, this positive connection is broken when the check has moved just the right distance determined by the length of the word which has been printed. The feed stroke is determined by a controlling gage member which is mounted independently of the printing wheel and the carrier therefor. When the printing wheel is at the upper end of its stroke, the gear carried thereby is caused to mesh with a gear operated by a shaft controlled by a hand knob, which shaft is continuously in gear with the gage member so that by the turning of the knob the gage member and the printing wheel will be simultaneously turned and set for a printing operation. It is extremely essential that the timing of the gage member and the printing wheel shall be preserved. In order to bring this about, locking means is provided both for the gage member and the printing wheel. This is necessary for the reason that the printing wheel is moved out of engagement with its operating gear when the carrier moves downward to carry the type into contact with the check.

With this brief reference in a general way to some of the essential features, a detailed description of the preferred form of the invention as shown in the drawings will be given. In these drawings, the numeral 1 indicates the bed of the machine, the same being provided with pads or feet 2 in desired number for supporting the machine and to prevent scratching the article on which the machine is set. The bed of the machine has mounted thereon, and held thereto in any suitable manner, the inclosing frame 3, the open face of which is covered by the dialed face-plate 4 secured in place in any suitable manner. The frame 3 is so formed as to produce between the bottom of the latter and the bed 1 a check-guiding slot 5 through which the check is fed under the impulse of the feeding mechanism. A combined presser and stripper is mounted in any suitable manner to press the check upon the bed and prevent the same from being lifted by the printing-wheel in the upward movement of the latter after a printing operation, the presser-feet or pads of the combined presser and stripper being indicated at 6, Fig. 1, where it is shown above the check 7, which is at rest upon the bed and the platen 8, which coöperates with the printing-wheel 9, the latter, as is common in this type of machine, being provided with a plurality of type-blocks 10, the surfaces of which are formed or provided with lines of type of varying length corresponding to, and spelling, the number or word indicated on the dial of the faceplate 4. The printing-wheel 9 is journaled on the shaft 11 in the carrier and plunger 12, and said shaft 11, or the center of said printing-wheel, has secured thereto the pointer 13 which rotates with the printing-wheel and indicates on the dial the printing-block which is in position to make an impression upon the check in coöperation with the platen. The printing-wheel is depressed by the engagement of the cams 14 at the ends of the yoke 15, which latter is secured to the crank-shaft 16, journaled in the upper part of the frame 3 and provided at one end with the crank 17, the handle of which is grasped for the purpose of rotating the shaft to cause the cams 14 to engage the anti-frictional rolls 18, carried by the plunger 12. The downward movement is given to the printing-wheel by the operator swinging the crank 17; but, the upward movement is imparted by the springs 19 connected to the top of the frame 3, and to the plunger 12, see Fig. 4.

The plunger 12, at its rear, is provided with a pair of lugs 20 forming a notch or recess 21 between them for the reception of the headed end 22 of the feed-actuator 23, journaled upon the shaft 24, see Figs. 5 to 8, inclusive. The actuator 23 is provided with an elongated slot 25 adapted to receive the pin 26. The pin slides in the sleeve 27 which carries the actuator 23, said sleeve being journaled upon the shaft 24. The slot 25 also receives the spring-controlled pin-plunger 28 carried by the sleeve 29 of the feed-arm 30, said sleeve 29 being also journaled upon the shaft 24 and having secured thereto a stiff, wide spring 31, as by a screw 32, adapted to bear upon the sleeve 27 in the path of movement of the actuator 23, the part of the latter which coöperates with said spring being indicated at 33. At the end of the sleeve 27 opposite the actuator 23, the shaft 24 has a sleeve 34 journaled thereon and provided with a semi-circular radial groove or depression 35 adapted to receive the adjacent end of the pin 26, the sleeve 34 being normally held, at one extreme of its movement on the shaft, by spring 36 secured thereto, as by screw 37, and the other end of which spring is secured to the back of the frame of the machine, as at 38, see Figs. 3 and 4. The sleeve 34 is also provided with the controlling arm 39 extending from the shaft at nearly a right-angle to the actuator 23. On the shaft 24 next the arm 39 is an arm 40 provided with aperture 41, said arm being journaled on the shaft and having coöperating with it the lever 42, Figs. 3 and 4, pivoted to the back of the printing-wheel 9 and forming part of the means for locking the wheel in adjusted or set position for printing. This mechanism is shown and claimed in my co-pending application, Serial Number 237,969, filed of even date herewith. Next the arm 40 is a collar 43 which, when all the parts are forced together on the shaft 24 in normal position, as shown in Fig. 5, is held or locked to the shaft by the screw 44. The spring 45, see Fig. 5, tends to press the pin-plunger 28 normally toward the actuating arm 23. The adjacent end of the shaft 24 is reduced, as at 46, and rests within an aperture 47, just large enough to receive it, thus journaling said end of the shaft in the frame 3. The other end is supported by the screw 46ª supported in the frame. The feed-arm 30, at its lower end 48, is bifurcated and has, operating in the slot thereof, the pin 49 laterally projecting from the feed-slide 50, the latter being an elongated plate, the ends of which are overturned, as at 51, 52, Fig. 5, upon the guide-bar 53 secured to the frame 3 at the bottom thereof in any suitable manner, the overturned members 51, 52 being at a right-angle to each other, as are also the members of the bar 53, the feed-slide 50 being thus firmly held upon, and guided on, said bar 53 in the operation of the feeding mechanism. At its forward end, the feed-slide 50 has journaled thereon the feed-dog or device 54, see Figs. 3 and 4, the executive end of which, see Fig. 9, is provided with a plurality of sharp prongs 55 adapted to engage the upper surface of the check to feed the same over the bed. The upper end of the feed-dog is journaled on a pin 56, set in the feed-slide 50, a spring 57 surrounding said pin 56 having one end secured to the latter and the other end secured to the upper end of the feed-dog, whereby to normally tend to turn said dog around the axis of the pin 56 and into engagement with the check at rest upon the bed. The turning movement of the feed-dog is limited by the arm 59 extending rearwardly from the upper end of the feed-dog in position to engage the pin 60 extending from the feed-slide 50. At the forward end of the guide-bar 53 a detent or check-retainer 61 is journaled by ears 62 upon a pin 63 supported in lugs 64 extending upwardly from the bar 53. A spring 65 surrounds the pin 63 between the ears 62 and has one end connected to the detent in any suitable manner, and the other ends secured to said pin, thus causing said detent to normally turn upon its journal-pin 63 into engagement with the check. To prevent the detent from being turned too far backwardly on its axis, a lug 66 is extended from the support 53 in the path of movement of said detent. The lower executive end of the detent 61 is provided with a plurality of sharp prongs 67, similar to those of the feed-dog, which engage the upper surface of the check. Viewing Figs. 1 to 4, inclusive, it will be seen that the bed 1 has set therein a plate 68 extending from front to back of the bed and of a width considerably greater than that of the feed-dog and detent. The upper surface of the plate 68 is provided with ridges and grooves which coöperate with the prongs of the feed-dog and detent, the ridges of the plate coöperating with the slots and the grooves of the plate coöperating with the prongs, respectively, of the said dog and detent. Thus, the check material 7 is engaged on its bottom surface by the ridges of the plate 68 and on the top surface by the prongs of the feed-dog and detent, said prongs tending to press the paper into the grooves of the plate 68, and bending and firmly gripping said paper so as to enable the latter to be slid in one direction over the plate, and prevent it from being moved in the other direction.

The feed stroke of the dog 50 is controlled through the medium of the arm 39, the upper end of which, at its front, is normally in yielding engagement, under stress of spring 36, with a shoulder 69 at the bottom of the depending member 70 of the frame.

At its back, the said arm 39 is adapted to engage the controlling cam or gage-member 71 provided on its face with a plurality of spaced-apart projections or ridges 72 of variable height formed radially of the said member 71 and arranged circumferentially of said member. The gage-member is flat on its back and rests against the back of the frame, and on its circumference is provided with spaced-teeth 73 adapted to coöperate with a locking dog 74 carried by a lever pivoted at 75 to the back of the frame and having a prong 76 which extends into the path of movement of an elongated pin 77, extending rearwardly from the plunger or printing-wheel carrier 12, Figs. 2 and 5. The pin 77 also coöperates with the slot 77$^a$ in the locking dog lever, after engaging the prong 76 in its upward movement to remove dog 74 from the teeth 73; and coöperates with the straight extension 77$^x$ of the lever in its downward movement to drive and hold said dog in engagement with the teeth 73, thus locking the gage-member 71 from movement. The gage-member 71 is fixed to the shaft 78, journaled in the depending frame-member 70, which shaft has at its forward end a gear-wheel 79 meshing with the gear-wheel 80 carried by the shaft 11. The gear 79 coöperates with the spur-wheel 81 carried by the shaft 82, journaled in the member 70 and side of the frame opposite the crank 17 and having a collar 83 fixed thereon to prevent said shaft from being withdrawn through the frame, and to hold the spur-wheel 81 in coöperative relation to the gear 79. Outside the frame the shaft 82 is provided with a knob 84, by which the shaft 82 may be turned so as to rotate the spur-wheel 81, and through the gear 79 and shaft 78 rotate the gage-member 71 simultaneously with the rotation of the printing-wheel 9 by coöperation of the gear 79 with the gear 80. The projections 72 on the face of the gage-member are of a height to correspond with the length of the words on the type-blocks 10 of the printing-wheel and said gage-member is set normally so that its projections or shoulders will correspond with the proper line of type on the printing-wheel. Thus, when the printing-wheel is rotated by the knob 84, the gage-member will also be rotated, and, when the proper line of type has been set for printing, a corresponding gage projection will be in position to coöperate with the controlling arm 39. Hence, the following mode of operation will be readily understood.

The printing-wheel having been set, by knob 84, so that the desired line of type or printing-block will be in position to coöperate with the platen and thus print the check, the crank-arm 17 will be turned toward the operator so as to rotate the shaft 16, turn the cams 14 downwardly into engagement with the anti-frictional rolls 18, and thus depress the plunger 12 and the printing-wheel. The downward movement of the plunger 12 will move the actuator 23 downwardly through the medium of the upper one of the lugs 20 engaging the headed end 22 of said actuator. The first portion of the downward movement of the actuator 23 will be idle or without function relatively to the feed-arm 30, as shown in Figs. 6 and 7, the feed-arm, thus, deriving no movement from the initial movement of the actuator. The pin 26 in sleeve 27 will, however, be moved bodily into alinement with the pin-plunger 28, and toward the slot 35 in sleeve 34. The idle movement of the actuator, relatively to the feed-arm 30, compensates for the variable forward position of the arm, slide and feed-dog after the feed movement, variable in extent under the control of arm 39 and gage 71, has been given. The continued downward movement of the actuator will, through the stiff spring 31, yieldingly swing the feed-arm 30 rearwardly, thus carrying the feed-slide 50 and feed-dog 54 rearwardly to the position of Fig. 4, this being a constant position of preparation for a feeding movement of predetermined extent under control of the arm 39 and the gage-member 71. When the pin 26 is brought into end-to-end engagement with the pin-plunger 28, the spring 45 will tend to force the two pins longitudinally of the shaft 24, so as to cause the opposite end of the pin 26 to enter the groove 35 of the sleeve 34. When the pin 26 reaches the groove 35 and snaps thereinto, the actuator will have reached the limit of its downward movement, the pin 28 will have entered the slot 25 of the actuator 23, and the feed-slide, feed-arm and feed-dog will have reached the backward extreme of their movements preparatory to a regulated feed movement; but, to prevent any strain upon the slide 50 and arm 30, after the latter have reached their backward limit, the pin 28 moves in slot 25 of the actuator and the latter finishes its downward movement without imparting any movement to the feed-arm, the spring 31 yielding to such finishing stroke or movement of the actuator. The casing serves as a limiting stop for determining the extreme rearward movement of the feed slide. Thus, the sleeve 34, sleeve 27, actuator 23, and feed-arm 30 are all temporarily locked together and are ready to be moved together, the spring-pressed pin-plunger 28 being at the upper end of the slot 25. The parts are now ready to have their movements reversed, and as the actuator moves upwardly, the sleeve 34 and controlling-arm move with it; but, the feed-arm 30 does not begin to move until the pin-plunger 28 reaches the bottom of slot 25 in alinement with the pin 26. This gives ample time for the printing-wheel to rise far enough to avoid interference with the feed-dog 54. Thus the slot 25 has several important functions: (1) It permits movement of actuator 23, relatively to feed-arm 30, to prevent breaking strain upon the actuator and feed-arm when the latter reaches its backward extreme; (2) it permits movement of the actuator relatively to the feed-arm to prevent the latter from moving forward too soon; and (3) it gives time for the printing-wheel to release the paper and clear the track for the movement forward of both the feed-dog and paper. The movements of the parts are reversed by releasing the crank 17, permitting the springs 19 to pull upwardly on the plunger 12, thus elevating the printing-wheel 9 and turning the cams 14 and shaft 16 on which said cams are carried. The upward movement of the plunger releases the paper from the printing-wheel, lifts the actuator, and the latter swings the feed-arm 30 toward the front of the machine, thus moving the feed-slide 50 and feed-dog 54 toward the front of the machine, the feed-dog feeding the paper in the direction of the arrow, as shown in Fig. 3. This is accomplished by the lower one of the lugs 20 engaging the head-end 22 of the actuator 23, causing the latter to turn the three connected members, as above described, on the shaft 24; that is to say, the pin 26, engaging the groove 35, turns the sleeve 34 and arm 39 against the pull of the spring 36, and the pin 28 turns the sleeve 29 and feed-arm 30, until the controlling arm 39 engages one of the shoulders 72 of the gage 71, which is set in position for such engagement and which corresponds to the length of the printing block which has made its impression upon the paper. Such engagement is shown by dotted lines in Fig. 3. Thus, the paper is fed the extent of the impression of the printing block, plus the space between the latter and the next impression to be made upon the paper. When the controlling arm 39 engages the shoulder of the gage-member standing in its path, the plunger 12 has not quite reached its extreme upper position. Hence, the actuator 23 has still a distance to travel upwardly, resulting in causing the wall of the groove 35 in sleeve 34 to push the pin 26 longitudinally in the sleeve 27, thus breaking the connection between the said two sleeves and driving the pin 28 in the sleeve 29 against the tension of the spring 45, thus also breaking the connection between the actuator 23 and the sleeve 29. The moment the connection between the sleeves 24 and 37 is broken, the spring 36 takes control of the sleeve 34 and turns it, with its arm 39, forwardly on the shaft 24 until the front end of the arm 39 engages the shoulder 69 of the depending frame-member 70, thus limiting the forward turning movement of the sleeve 34 and removing the arm 39 from engagement with the gage-member 71, leaving the latter free to be again turned or shifted correspondingly with the movement imparted in either direction to the printing-wheel 9. When the connection between the sleeves 34 and 27 is broken, the feed-dog has completed its forward or feeding movement, this being variable or adjustable, as above explained, under control of the arm 39 and gage-member 71. The further upward movement of the actuator 23, to its upper extreme, is independent of the feed-arm 30, the actuator moving from engagement with the spring 31, as shown in Figs. 3 and 6. When the parts have assumed their normal position, they will have the relation substantially as shown in Figs. 3 and 5, the feed-dog being at the forward limit of its feed movement and ready to be shifted rearwardly to preparatory position. When so shifted, the feed-dog turns on its axis against the tension of the light coiled spring 57, thus sliding lightly over the paper without giving any movement thereto. Furthermore, to prevent the paper from being retrograded, the detent 61, which has yielded forwardly under its light spring pressure during the forward feed movement of the paper, engages the latter at the end of the feed movement and prevents the paper from moving in the machine during the rearward movement of the feed-dog 54. Thus, while the feed-dog moves the paper forwardly, the detent yields and permits the free passage of the paper; but, when the feed-dog yields to move backwardly, the detent firmly engages the paper and prevents it from moving backwardly. It will be readily understood that the feed stroke is at all times controlled in extent by the gage shoulder presented in the path of the controlling arm 39 and that the feed movement is automatic while the feed preparatory movement is under control of the operator.

Having thus described my invention, what I claim and desire to secure by Letters Patent is:

1. In a check protecting machine, the combination with a printing wheel provided with a plurality of rows of types of different lengths, means for shifting said printing wheel to bring any desired row of type into printing position, a platen arranged beneath the printing wheel, and means for causing a relative movement between the printing wheel and platen, of a feeding mechanism including a reciprocating feeding device movable in a direction parallel with the lines of type and directly engaging the check for feeding the same, a gage member and devices controlled thereby for regulating the stroke of said feeding device to correspond to the length of the row of type in position for printing.

2. In a check protecting machine, the combination with a printing wheel provided with a plurality of rows of types of different lengths, means for shifting said printing wheel to bring any desired row of type into printing position, a platen arranged beneath the printing wheel, and means for causing a relative movement between the printing wheel and platen, of a feeding mechanism including a reciprocating feeding device movable in a direction parallel with the lines of type and directly engaging the check for feeding the same, a gage member and devices controlled thereby for regulating the stroke of said feeding device to correspond to the length of the row of type in position for printing, said feeding device being located at one side of said row of type.

3. In a check protecting machine, the combination with a printing wheel provided with a plurality of rows of types of different lengths, means for shifting said printing wheel to bring any desired row of type into printing position, a platen arranged beneath the printing wheel, and means for causing a relative movement between the printing wheel and platen, of a feeding mechanism including a reciprocating feeding device movable in a direction parallel with the lines of type and directly engaging the check for feeding the same, a gage member and devices controlled thereby for regulating the stroke of said feeding device to correspond to the length of the row of type in position for printing, and a yielding detent engaging said check for preventing retrograde movement of the check on the non-feeding stroke of said feeding device.

4. In a check protecting machine, the combination with a printing wheel provided with a plurality of rows of types of different lengths, means for shifting said printing wheel to bring any desired row of type into printing position, a platen arranged beneath the printing wheel, and means for causing a relative movement between the printing wheel and platen, of a feeding mechanism including a reciprocating feeding device movable in a direction parallel with the lines of type and directly engaging the check for feeding the same, a gage member and devices controlled thereby for regulating the stroke of said feeding device to correspond to the length of the row of type in position for printing, said feeding device having prongs, and means coöperating therewith for bending the check whereby said prongs firmly grip the check.

5. In a check protecting machine, the combination with a printing wheel provided with a plurality of rows of types of different lengths, means for shifting said printing wheel to bring any desired row of type into printing position, a platen arranged beneath the printing wheel, and means for causing a relative movement between the printing wheel and platen, of a feeding mechanism including a reciprocating feeding device movable in a direction parallel with the lines of type and directly engaging the check for feeding the same, a gage member and devices controlled thereby for regulating the stroke of said feeding device to correspond to the length of the row of type in position for printing, said feeding device having spaced prongs, and a supporting plate beneath said feeding device having spaced grooves forming ridges extending between the prongs for bending the paper to cause the prongs to grip the same.

6. In a check protecting machine, the combination with a printing wheel provided with a plurality of rows of types of different lengths, means for shifting said printing wheel to bring any desired row of type into printing position, a platen arranged beneath the printing wheel, and means for causing a relative movement between the printing wheel and platen, a feed slide mounted for movement back and forth in a direction parallel with the lines of type, a feed dog yieldingly carried thereby and directly engaging the check for feeding the same, means for moving said feed slide back and forth, a gage member, and devices controlled thereby for regulating the stroke of said feed slide to correspond to the length of the row of type in position for printing.

7. In a check protecting machine, the combination with a printing wheel provided with a plurality of rows of types of different lengths, means for shifting said printing wheel to bring any desired row of type into printing position, a platen arranged beneath the printing wheel, and means for causing a relative movement between the printing wheel and platen, a feed slide mounted for movement back and forth in a direction parallel with the lines of type, a feed dog yieldingly carried thereby and directly engaging the check for feeding the same, means for moving said feed slide back and forth, a gage member, and devices controlled thereby for regulating the stroke of said feed slide to correspond to the length of the row of type in position for printing, and a yielding detent for engaging said check for preventing retrograde movement thereof on the non-feeding stroke of said feed dog.

8. In a check protecting machine, the combination with a printing wheel provided with a plurality of rows of types of different lengths, means for shifting said printing wheel to bring any desired row of type into printing position, a platen arranged beneath the printing wheel, and means for causing a relative movement between the printing wheel and platen, a feed slide mounted for movement back and forth in a direction parallel with the lines of type, a feed dog yieldingly carried thereby and directly engaging the check for feeding the same, means for moving said feed slide back and forth, a gage member, and devices controlled thereby for regulating the stroke of said feed slide to correspond to the length of the row of type in position for printing, said feed dog being pivoted to said feed slide and a spring for yieldingly forcing said feed dog into engagement with said check.

9. In a check protecting machine, the combination with a printing wheel provided with a plurality of rows of types of different lengths, means for shifting said printing wheel to bring any desired row of type into printing position, a platen arranged beneath the printing wheel and means for causing a relative movement between the printing wheel and platen, of a feeding mechanism including a feed dog mounted to reciprocate back and forth in a direction parallel with the lines of type and directly engaging the check for feeding the same, a gage member, and devices controlled thereby for determining the extent of forward movement of the feed dog, whereby the stroke of the feed dog may be regulated to correspond to the length of the row of type in position for printing.

10. In a check protecting machine, the combination with a printing wheel provided with a plurality of rows of types of different lengths, means for shifting the printing wheel to bring any desired row of type into printing position, a platen arranged beneath the printing wheel, and means for causing a relative movement between the printing wheel and platen, of a feeding mechanism including a feed dog mounted for movement back and forth in a direction parallel with the lines of type and directly engaging the check for feeding the same, an actuating member for said feed dog, devices for positively connecting said actuating member to the feed dog for imparting thereto its feeding movement, a gage member and devices controlled thereby for disconnecting the actuating member from the feed dog at a predetermined time regulated by the length of the row of type in position for printing.

11. In a check protecting machine, the combination with a printing wheel provided with a plurality of rows of types of different lengths, means for shifting said printing wheel to bring any desired row of type into printing position, a platen arranged beneath the printing wheel, and means for causing a relative movement between the printing wheel and platen, of a feeding mechanism including a reciprocating feeding device, an actuating member operated by the means for causing a relative movement between the printing wheel and platen for moving said feeding device forward to feed the check, and devices for connecting said actuating member to said feeding device after the platen and printing wheel have been initially separated and for disconnecting the actuating member from said feeding device when said feeding device has been moved a distance corresponding to the length of the row of type in position for printing.

12. In a check protecting machine, the combination with means for printing the check, a feeding mechanism for feeding the check including a feed dog engaging the check, means operated by the printing means during a printing operation for moving the feed dog to one extreme preparatory to a feeding operation, and means whereby after the printing operation has been performed the feed dog is moved a predetermined distance corresponding with the length of the word printed.

13. In a check protecting machine, the combination with a printing wheel and means for raising and lowering the printing wheel for printing the check, of a feeding mechanism including a feed dog for engaging and moving the check in a direction parallel with the length of the word printed, and devices operated by the raising and lowering means for the printing wheel for moving the feed dog to one extreme preparatory to a feeding operation and after the printing operation has been performed for moving the feed dog a predetermined distance corresponding to the length of the word printed.

14. In a check protecting machine, the combination with a printing wheel and means for raising and lowering the printing wheel for printing the check, a reciprocating feed slide, a yielding feed dog carried thereby and directly engaging the check for feeding the same, and devices operated by the raising and lowering means for moving the feed slide to one extreme preparatory to a feeding operation on the lowering of the printing means and for moving the feed dog after the printing operation and upon the raising of the printing means for moving the feed slide a predetermined distance for feeding the check corresponding with the length of the word printed.

15. In a check protecting machine, the combination of a printing wheel, a carrier in which said printing wheel is mounted, means for raising and lowering the carrier, and a platen coöperating with said printing wheel, an actuating member oscillated by said carrier, a feed dog, means for supporting said feed dog whereby the same may be moved back and forth in a direction at right angles to the plane of reciprocation of the carrier, and means operated by said actuating device whereby said feed dog is moved to one extreme preparatory to a feeding operation when the carrier is lowered and whereby said feed dog is moved a predetermined distance in a forward direction when said carrier is raised.

16. In a check protecting machine, the combination with a printing wheel, a vertically reciprocating carrier in which said printing wheel is mounted, said printing wheel having a plurality of rows of types of different lengths extending in a direction parallel with the axis of the printing wheel, means for shifting said printing wheel to bring any desired row of type into printing position, a feed dog, means for supporting said feed dog, whereby the same may be moved in a direction parallel with the lines of type, means for yieldingly causing said feed dog to engage the check for feeding the same, an actuating member oscillated by said carrier as it is raised and lowered, and devices between said actuating member and said feed dog for moving said feed dog to one extreme preparatory to a feeding operation when the carrier is lowered for printing and for moving said feed dog in the opposite direction a predetermined distance corresponding to the length of the word printed when said carrier is raised.

17. In a check protecting machine, the combination with a printing wheel, a vertically reciprocating carrier in which said printing wheel is mounted, said printing wheel having a plurality of rows of types of different lengths extending in a direction parallel with the axis of the printing wheel, means for shifting said printing wheel to bring any desired row of type into printing position, a feed dog, means for supporting said feed dog, whereby the same may be moved in a direction parallel with the lines of type, means for yieldingly causing said feed dog to engage the check for feeding the same, an actuating member oscillated by said carrier as it is raised and lowered, and devices between said actuating member and said feed dog for moving said feed dog to one extreme preparatory to a feeding operation when the carrier is lowered for printing and for moving said feed dog in the opposite direction a predetermined distance corresponding to the length of the word printed when said carrier is raised, said devices being constructed so as to connect the actuating member with the feed dog for positive movement in a forward direction after the printing wheel has moved a predetermined distance away from the check being printed.

18. In a check protecting machine, the combination with a printing wheel provided with a plurality of rows of types of different lengths, means for positioning said printing wheel to bring any desired row of type into printing position, of a feeding mechanism including a reciprocating member, means for moving the reciprocating member rearwardly during the printing operation to a fixed point and for moving said reciprocating member forwardly after the printing operation to a point determined by the length of the word which has been printed.

19. A feeding mechanism for check protecting machines comprising a reciprocating feed slide, a rotary gage for controlling the movements of the slide, and means intermediate the slide and the gage including an actuator, a controller, and a feed arm, and means for temporarily coupling the actuator, controller and feed arm for driving and controlling the movements of the feed slide.

20. A feeding mechanism for check protecting machines comprising a feed slide, a gage member, and means connecting the gage member and the feed slide for controlling the movements of the latter, including an actuator, a controller, and a feed arm, and means for temporarily coupling the said actuator, controller and feed arm.

21. A feed actuating mechanism for check protecting machines comprising a supporting shaft, a controlling arm, an actuator, and a feed arm mounted thereon, means for coupling the said three members temporarily, and means for giving the controlling arm movements independently of the actuator.

22. A feed actuating mechanism for check protecting machines comprising a supporting shaft, a controlling arm, an actuator, and a feed arm mounted thereon, means for coupling the said three members temporarily, and means for giving the actuator movements independently of the feed arm.

23. A feed actuating mechanism for check protecting machines comprising a supporting shaft, a controlling arm, an actuator, and a feed arm mounted thereon, means for coupling the said three members temporarily, and means for giving the actuator movements in excess of the feed arm to avoid strain on the latter.

24. A feed actuating mechanism for check protecting machines comprising a supporting shaft, a controlling arm, an actuator, and a feed arm mounted thereon, means for coupling the said three members temporarily, and means for giving the actuator movements in excess of the feed arm to compensate for the variable feed movements of the latter.

25. A feed actuating mechanism for check protecting machines comprising a supporting shaft, a controlling arm, an actuator, and a feed arm mounted thereon, means for coupling the said three members temporarily, and means for giving the actuator movements in excess of the feed arm to prevent the latter starting upon its feed movement too soon.

26. A feeding mechanism for check protecting machines comprising a feed dog having prongs for engaging the upper surface of the check, a stationary plate provided with ridges and grooves for coöperation with the prongs of the feed dog whereby the latter is enabled to grip and feed the check, and means for actuating the feed dog.

BENJAMIN O. FANSLOW.